(12) United States Patent
Marc

(10) Patent No.: US 10,272,627 B2
(45) Date of Patent: Apr. 30, 2019

(54) SYSTEM AND METHOD FOR MOLDING COMPLEX THREE-DIMENSIONAL ARTICLES

(71) Applicant: NOVATION IQ LLC, Lenexa, KS (US)

(72) Inventor: Michel Marc, Lenexa, KS (US)

(73) Assignee: NOVATION IQ LLC, Lenexa, KS (US)

( * ) Notice: Subject to any disclaimer, the term of this patent is extended or adjusted under 35 U.S.C. 154(b) by 421 days.

(21) Appl. No.: 14/943,571

(22) Filed: Nov. 17, 2015

(65) Prior Publication Data
US 2017/0136719 A1    May 18, 2017

(51) Int. Cl.
*B29C 35/12*    (2006.01)
*B29D 30/06*    (2006.01)
*B29D 30/54*    (2006.01)

(52) U.S. Cl.
CPC ..... *B29D 30/0654* (2013.01); *B29D 30/0662* (2013.01); *B29D 30/54* (2013.01); *B29D 2030/0659* (2013.01); *B29D 2030/0674* (2013.01); *B29D 2030/545* (2013.01)

(58) Field of Classification Search
CPC ............ B29D 30/0654; B29D 30/0662; B29D 30/54; B29D 2030/0674; B29D 2030/0659; B29D 2030/545
See application file for complete search history.

(56) References Cited

U.S. PATENT DOCUMENTS

| | | | |
|---|---|---|---|
| 2,438,952 A * | 4/1948 | Te Grotenhuis | ........ B29C 35/12 219/765 |
| 2,792,593 A | 5/1957 | Hardgrove | |
| 3,504,063 A | 3/1970 | Lemelson et al. | |
| 3,770,931 A | 11/1973 | Gilliatt | |
| 4,258,776 A | 3/1981 | Walters et al. | |
| 4,268,238 A | 5/1981 | Marc | |
| 4,441,876 A | 4/1984 | Marc | |
| 6,241,929 B1 | 6/2001 | Akopyan | |
| 7,232,299 B2 | 6/2007 | Marc | |
| 7,837,910 B2 | 11/2010 | Marc | |
| 8,236,212 B2 | 8/2012 | Marc | |
| 8,298,470 B2 | 10/2012 | Marc | |

(Continued)

OTHER PUBLICATIONS

PCT Search Report and Written Opinion dated Mar. 16, 2017 for co-pending PCT application, PCT/US2016/62153. (18 pgs).

*Primary Examiner* — Galen H Hauth
(74) *Attorney, Agent, or Firm* — Stinson Leonard Street LLP

(57) ABSTRACT

A system and method for molding complex three-dimensional articles is disclosed. The system includes a mold for receiving an article made of at least one moldable material and, in one example, the article comprises at least one flat region and at least one radial region. The mold comprises an inner bladder that conforms to an inner surface of the article when pressurized and an outer mold that contacts an outer surface of the article. The system also includes an inner electrode spaced from an outer electrode, and a generator operable to generate an alternating electric field between the electrodes and across the article in the mold to obtain substantially even heating of the moldable material in the flat region and the radial region at the end of the heating cycle.

35 Claims, 7 Drawing Sheets

(56) References Cited

U.S. PATENT DOCUMENTS

| | | |
|---|---|---|
| 8,357,726 B2 | 1/2013 | Marc |
| 8,470,897 B2 | 6/2013 | Marc |
| 8,602,927 B2 | 12/2013 | Marc |
| 8,715,437 B2 | 5/2014 | Marc |
| 8,815,964 B2 | 8/2014 | Marc |
| 8,961,889 B2 | 2/2015 | Marc |
| 9,162,114 B1 | 10/2015 | Marc |
| 2006/0158122 A1 | 7/2006 | Staines |
| 2009/0236030 A1 | 9/2009 | Marc |
| 2010/0096780 A1 | 4/2010 | Marc |
| 2011/0178191 A1 | 7/2011 | Marc |
| 2012/0290048 A1 | 11/2012 | Marc |
| 2012/0290049 A1 | 11/2012 | Marc |
| 2012/0290050 A1 | 11/2012 | Marc |
| 2012/0301689 A1 | 11/2012 | Marc |
| 2016/0354954 A1 | 12/2016 | Marc |

\* cited by examiner

SYSTEM AND METHOD FOR MOLDING COMPLEX THREE-DIMENSIONAL ARTICLES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to a system and method for molding complex three-dimensional articles of varying thicknesses, radiuses of curvature and/or materials using radio frequency dielectric heating.

2. Description of Related Art

Three-dimensional molded articles made of rubber, plastic and other like materials are used in virtually every aspect of modern life. In the automobile industry alone, over one billion tires are produced each year across the world. The construction of a tire is complex and includes components made of different materials. For example, a radial tire generally includes the following components: (1) a tread area (including rib, tread blocks, sipes and grooves) made from a mixture of many different kinds of natural and synthetic rubbers; (2) cap plies (also referred to as crown plies) consisting of a layer or two of polyester fabric; (3) steel belts; (4) radial plies (also referred to as carcass or body plies) consisting of several layers of different fabrics coated with rubber; and (5) beads consisting of a loop of high-strength steel cable coated with rubber. Of course, other components made of other materials may also be used in other types of tires.

Tires are constructed using various methods of manufacture. In one method, the tire components are assembled onto a tire building drum and placed in a mold configured to give the tire its final shape. The mold is then heated in an oven to vulcanize the various rubber components of the tire. One problem with this method is that it generally requires a long cycle time to allow sufficient heat to transfer via thermal conductivity throughout the thickness of the tire. Another problem with this method is that the different thickness sections of the tire do not heat at the same rate, i.e., the thinner sections vulcanize in a shorter period of time than the thicker sections. Thus, if the heat is applied long enough to vulcanize the thicker sections of the tire, the thinner sections overheat and burn. Conversely, if the heat is applied only long enough to vulcanize the thinner sections of the tire without burning, the thicker sections are under-heated and do not sufficiently vulcanize.

Other methods have been disclosed to vulcanize the rubber components of a tire using radio frequency (RF) dielectric heating. For example, referring to the system 10 shown in FIG. 1, one method involves placing the unvulcanized rubber tire 12 in a mold 14 configured to give the tire its final shape. A bladder 16 is positioned inside the tire whereby pressurized air 18 is directed into the bladder 16 via an opening 20 so as to press the tire 12 against the mold 14. The mold 14 is positioned between two generally rectangular electrode plates—a high voltage electrode 22 and a ground electrode 24—such that the tire 12 is oriented in a flat position between the parallel electrodes. The electrodes 22, 24 are connected to a generator operable to apply an alternating electric field between the electrodes. The alternating electric field causes movement of polar molecules in the rubber components of the tire 12 whereby friction resulting from this molecular movement translates into heat throughout the rubber components.

One problem with this method is that the spacing between electrodes 22, 24 is fairly large, as the size of the tire limits how closely the electrodes can be placed. For example, a standard car tire has a sidewall height of about 5 to 8 inches and, thus, the distance between electrodes 22, 24 must be at least that distance. This larger spacing requires a fairy long curing time and, as a result, limits the number of tires that can be manufactured in a given period of time.

Another problem with this method is that the tire section shown as "A" in FIG. 1 will heat and vulcanize at a much faster rate than the tire section shown as "B" in FIG. 1. As can be seen, tire section B includes a large air gap between the two sidewalls of the tire. The dielectric constant of air is about 1 ($\varepsilon_{air}=1$) and the dielectric constant of the tire rubber is between about 3 and 14 depending on its formulation ($\varepsilon_{rubber}=3$ to 14). Thus, even in a case where the dielectric constant of the tire rubber is near the minimum value of 3, that is still approximately three times the dielectric constant of air. Because the current flow (I) through a material is proportional to the dielectric constant ($\varepsilon$) of the material, the current passing through tire section A will be about three times more than the current passing through tire section B. With reference to the power equation $P=I^2R$, it should be understood that the heat provided is proportional to $I^2$ and, as such, tire section A will heat approximately nine times faster than tire section B. Thus, when tire section A is fully vulcanized, tire section B will not yet be vulcanized. Conversely, when tire section B is fully vulcanized, tire section A will overheat and burn.

Simply put, the systems and methods known in the art for manufacturing three-dimensional molded articles do not achieve optimal heating of complex articles as they do not accurately take into account the varying physical parameters of the articles. Tires, for example, have varying thicknesses at different sections of the tire. Tires also include inner and outer surfaces with complex radiuses of curvature, and include different materials such as rubber and the steel belt(s) that are commonly used in the tread area of radial tires. Thus, there remains a need in the art for a system and method for efficiently manufacturing complex three-dimensional molded articles.

BRIEF SUMMARY OF THE INVENTION

The present invention is directed to a system and method for molding complex three-dimensional articles of varying thicknesses, radiuses of curvature and/or materials during a heating cycle. An example of an article to be molded in accordance with the invention is a tire that comprises a flat region, two small radius regions (wherein the thickness of the tire varies in the small radius regions), and two large radius regions. The tire has a plurality of rubber components that are molded during the heating cycle.

The system includes a mold for receiving the article to be molded. The article includes at least one moldable material that reaches its molding temperature in the mold at the end of the heating cycle. In the example of the tire, the moldable material may comprise vulcanized rubber that is devulcanized and revulcanized during the heating cycle and optionally fresh unvulcanized rubber. The moldable material may also comprise devulcanized rubber that is revulcanized during the heating cycle and optionally fresh unvulcanized rubber. The moldable material may also comprise only fresh unvulcanized rubber.

The system also includes an inner electrode spaced from an outer electrode, and a generator operable to generate an alternating electric field between the electrodes and across the article in the mold to obtain substantially even heating of the moldable material at the end of the heating cycle. Preferably, a temperature of a point on or within the moldable material compared to a temperature of each other point on or within the moldable material is ±25° C. or less at the end of the heating cycle, more preferably ±15° C. or less at the end of the heating cycle, and most preferably ±5° C. or less at the end of the heating cycle.

In one embodiment, the mold comprises an inner bladder that conforms to an inner surface of the article when pressurized and an outer mold that contacts an outer surface of the article. Thus, the distance between the electrodes is equal to a combined thickness of the article and the outer mold at any given point. In a preferred embodiment, the inner bladder functions as both the inner mold and the inner electrode. In one example, the bladder contains a conductive mesh and conforms to the inner surface of the article via injection of pressurized air behind the bladder. In another example, the bladder conforms to the inner surface of the moldable material via injection of a liquid conductor behind the bladder.

In another embodiment, the article comprises at least one flat region and at least one radial region. The outer electrode has a radius (R) in the radial region that enables substantially the same current to be provided through the flat region of the article and through the inner surface of the article in the radial region. The radius (R) of the outer electrode in the radial region determines a thickness of the outer mold in the radial region. The outer mold in the radial region is externally heated during the heating cycle to compensate for the temperature difference between the inner and outer surfaces of the article in the radial region.

In another embodiment, the article has varying thicknesses in the radial region. In this case, the spacing between the electrodes is adjusted to compensate for these varying thicknesses. In one example, an electrode section is added to or integrally formed with the outer electrode to narrow the spacing between the electrodes.

In another embodiment, the outer mold is externally heated during the heating cycle to compensate for a temperature difference between an inside radius and an outside radius around a circumference of the article, such as the circumference of a tire.

In yet another embodiment, the inner bladder and the outer mold are each preheated and maintained at a substantially constant temperature during the heating cycle so as to neutralize thermal conductivity losses between the moldable material and the mold during the heating cycle. In an alternative embodiment, the inner bladder and at least an inner skin of the outer mold are each modified to reach a temperature that is substantially the same as a molding temperature of the moldable material at the end of the heating cycle so as to neutralize thermal conductivity losses between the moldable material and the mold during the heating cycle. In this case, the inner bladder and the inner skin of the outer mold are each modified by increasing its dissipation factor via the use of one or more additives.

BRIEF DESCRIPTION OF THE DRAWINGS

Various exemplary embodiments of the present invention are described in detail below with reference to the attached drawing figures, wherein.

DETAILED DESCRIPTION OF EXEMPLARY EMBODIMENTS

Figure 1:
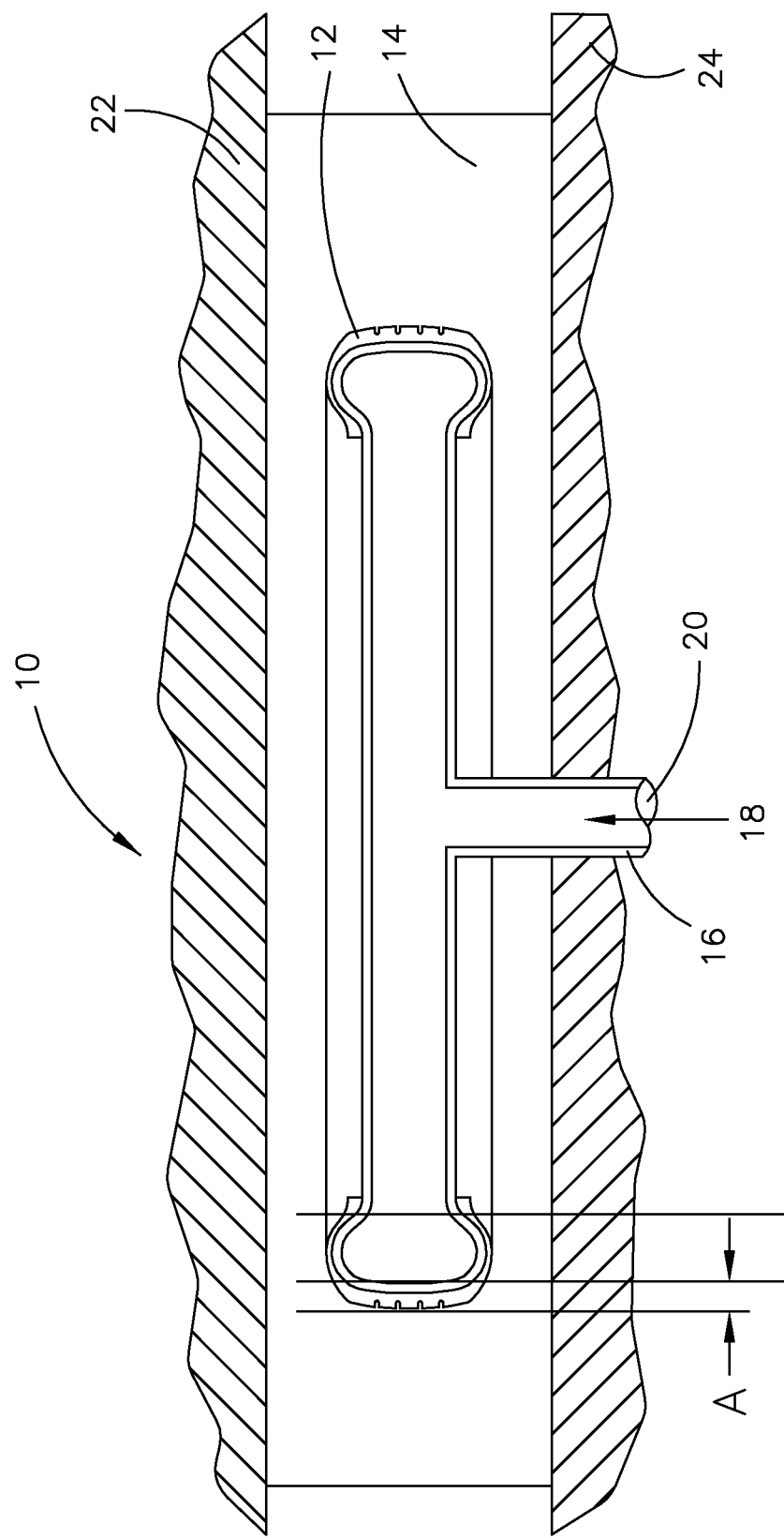
FIG. 1 is a cross-sectional view of a prior art system for molding a car tire.

The present invention is directed to a system and method for molding complex three-dimensional articles of varying thicknesses, radiuses of curvature and/or materials using radio frequency (RF) dielectric heating, i.e., heating caused by the application of an alternating electric field across an article. While the invention will be described in detail below with reference to various exemplary embodiments involving the manufacture of a car tire, it should be understood that the invention is not limited to the specific structural configuration or materials of these embodiments and that other types of articles may also be molded in accordance with the invention (including, but not limited to, others types of tires). In addition, although the exemplary embodiments are described as embodying several different inventive features, one skilled in the art will appreciate that any one of these features could be implemented without the others in accordance with the invention.

The articles that may be molded in accordance with the present invention may be made of a variety of different moldable materials including, but not limited to, thermoplastics and thermosets. Exemplary thermoplastics include ABS, acetal, acrylic (plexiglass), methylacrylate, polyamide (nylon), polycarbonate, polyester, ethylene vinyl acetate (EVA), ethylene vinyl alcohol, ethylene methyl acrylate, polyvinyl chloride (PVC), plastisol, polyvinylidene fluoride, surlyn ionomeror, thermoplastic urethane, and thermoplastic olefin. Exemplary thermosets include acrylic, epoxy, phenolic, polyester, melamine formaldehyde, composites, and rubbers. Of course, other thermoplastics and thermosets may also be molded in accordance with the present invention. For certain types of molded articles, it may be desirable to mix a blowing agent and/or cross-linker with a moldable material to form a foam material. Exemplary foam materials include cross-linked PE-EVA foam, PVC foam, vinyl nitrile foam, and neoprene foam. Of course, other foam materials may also be molded in accordance with the present invention. It should also be understood that certain materials are not sufficiently polar to be heated via the application of an alternating electric field. Such materials may be mixed with one or more polar additives to obtain the necessary polarity, which renders virtually any material capable of being molded in accordance with the present invention.

It should be understood that each of the foregoing moldable materials has a molding temperature associated therewith. As used herein, the term "molding temperature" means the temperature at which a moldable material is heated such that it may form a defined shape within a mold. For example, the molding temperature of a thermoplastic will typically be its melting temperature, and the molding temperature of a thermoset will typically be its curing temperature (e.g., the molding temperature of a rubber is the temperature required to achieve vulcanization). Also, the molding temperature of a foam material will typically be the temperature at which the foam material is blown and/or cross-linked.

The present invention enables the molding of complex three-dimensional articles of varying thicknesses, radiuses of curvature and/or materials, in such a manner as to obtain substantially even heating throughout the different regions of a molded article during a heating cycle. As used herein, the term "substantially even heating" of a moldable material means that, at the end of a heating cycle, the temperature of a point on or within the moldable material of an article compared to the temperature of each other point on or within the moldable material of the article is ±25° C. or less, i.e., ±25° C., ±23° C., ±21° C., ±19° C., ±17° C., ±15° C., ±14° C., ±13° C., ±12° C., ±11° C., ±10° C., ±9° C., ±8° C., ±7° C., ±6° C., ±5° C., ±4° C., ±3° C., ±2° C., ±1° C. or less. Without limiting the generality of the foregoing, the invention can be used to mold an article having two or more thickness sections, an article having two or more radiuses of curvature, an article having two or more thickness sections within the same radius of curvature, and an article having two or more thickness sections and two or more radiuses of curvature. These articles may be made of a single material or two or more materials.

Figure 2:
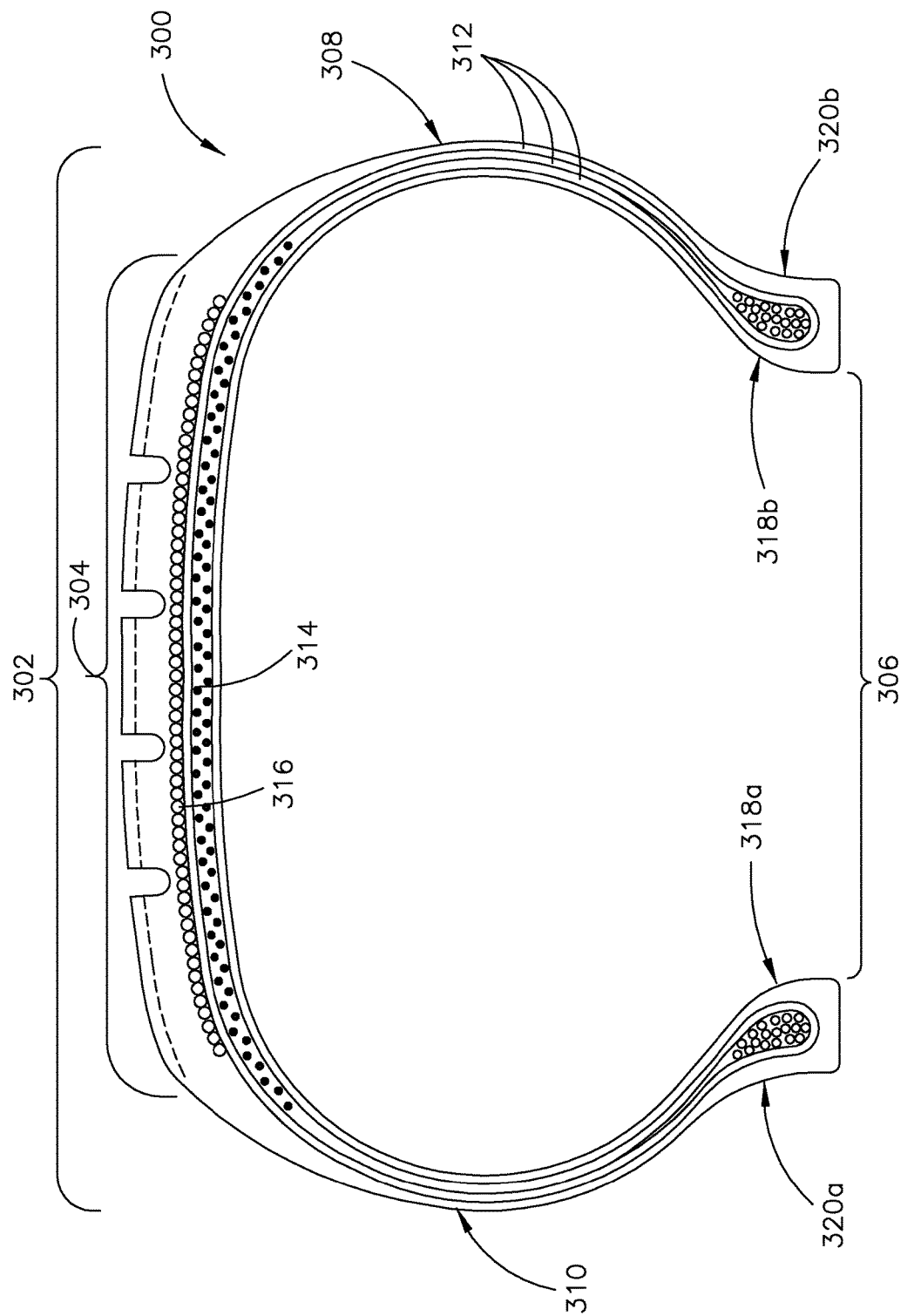
FIG. 2 is a cross-sectional view of a representative car tire that can be molded in accordance with the present invention.

Various exemplary embodiments of the present invention will be described below to illustrate the manufacture of an exemplary complex three-dimensional article, namely, a car tire. With reference to FIG. 2, a cross-sectional view of a typical steel-belted radial tire is depicted generally as reference numeral 300. Tire 300 consists of a semi-tubular shaped body 302 having a generally flat tread area 304 on the outer surface and an opening 306 extending between opposite sidewalls 308, 310 of the tire body. Tire body 302 includes radial plies 312 (also referred to as carcass or body plies) consisting of several layers of different fabrics coated with rubber, which extend radially around tire body 302 to form the body of the tire. Tire body 302 also includes plies of steel belts 314 extending under tread area 304, and one or more cap plies 316 (also referred to as crown plies) consisting of a layer or two of polyester fabric extending over steel belts 314. Tread area 304 includes a rib, tread blocks, sipes and grooves made from a mixture of many different kinds of natural and synthetic rubber, which extend over steel belts 314 and cap plies 316. The lower edge of each of sidewalls 308, 310 terminates in a slightly bulbous bead portion 318a, 318b comprised of bead wires and bead filler forming a bead chaffer 320a, 320b to seal against a wheel when installed. Of course, other components made of other materials may also be used in other types of tires, such as truck tires and aircraft tires.

Thus, as can be seen in FIG. 2, car tire 300 includes regions of varying thicknesses (e.g., tread area 304 is thicker than sidewalls 308, 310), curves of varying radii (e.g., the radius of curvature at the left and right sides of tread area 304 is smaller than the radius of curvature of the left and right sidewalls 308, 310), and components made of different materials (e.g., tread area 304 includes rubber, steel, and polyester).

I. First Exemplary Embodiment

Figure 3:
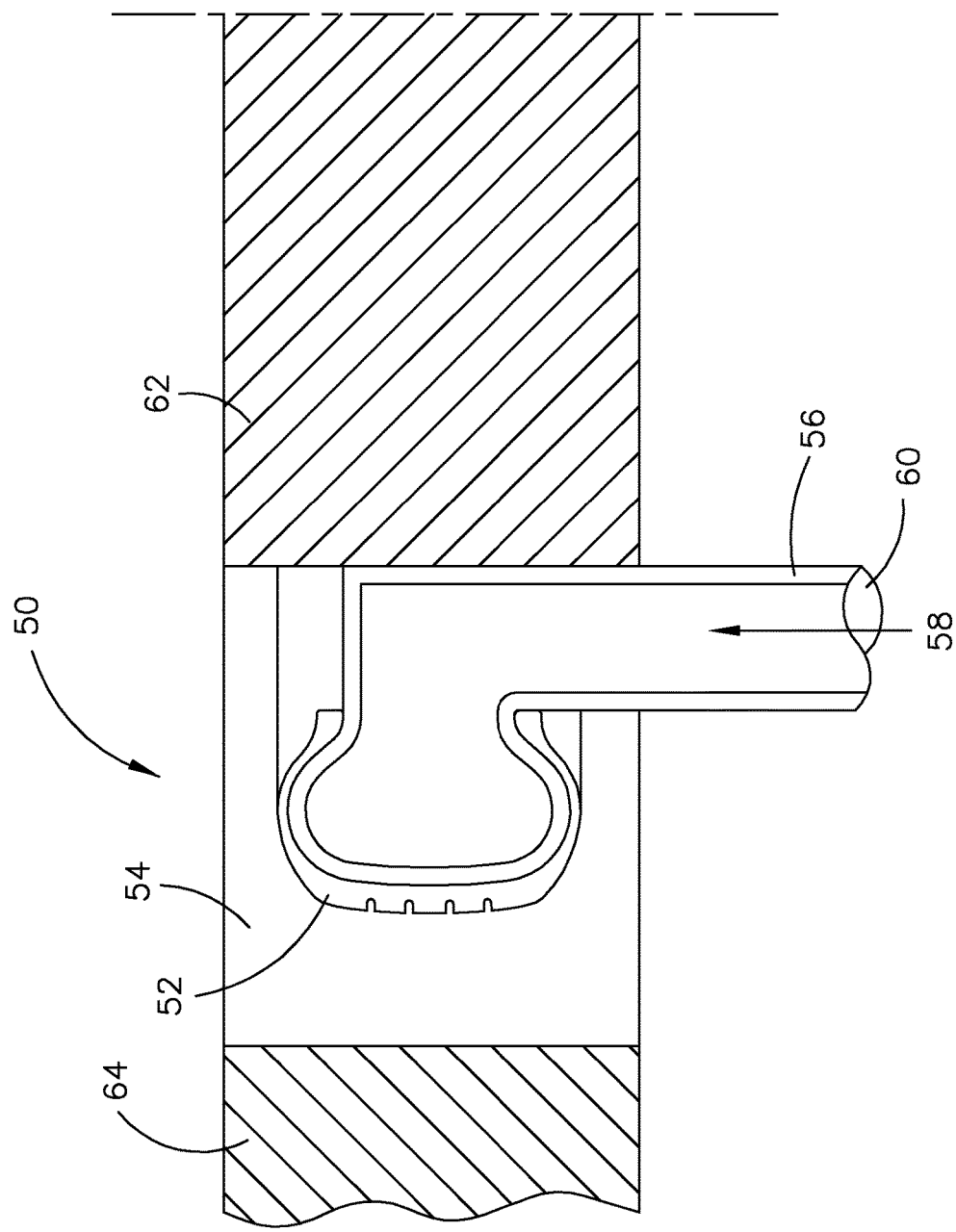
FIG. 3 is a cross-sectional view of a system for molding a car tire in accordance with a first exemplary embodiment of the present invention.

With reference to FIG. 3, a first exemplary embodiment of a system 50 for molding a car tire 52 (which has the same construction as car tire 300 shown in FIG. 2) is shown. In this embodiment, car tire 52 is placed in a mold 54 configured to give the tire its final shape. A bladder 56 is positioned inside the tire whereby a liquid 58 having a dielectric constant equal to that of the tire rubber is injected into the bladder 56 via an opening 60 so as to press the tire 52 against the mold 54. The mold 54 is positioned between two cylindrical electrodes—a high voltage electrode 62 positioned inside the opening of the tire and a ground electrode 64 positioned around the outside of the tire—such that the steel belts of tire 52 are congruent/parallel to the surfaces of the electrodes (as opposed to steel belts that are perpendicular to the electrodes as in the prior art system shown in FIG. 1). The electrodes 62, 64 are connected to a generator operable to apply an alternating electric field between the electrodes. The alternating electric field causes movement of polar molecules in the rubber components of the tire 52 whereby friction resulting from this molecular movement translates into heat throughout the rubber components.

It can be appreciated that system 50 overcomes several of the problems associated with the prior art system shown in FIG. 1. However, it is not without drawbacks. For example, the spacing between electrodes 62, 64 is still fairly large as limited by the size of the tire 52 (e.g., about 5 to 8 inches for a standard car tire). As such, the molding/curing time is greater than that of more closely spaced electrodes (such as those in the second exemplary embodiment discussed below). Also, the sidewalls of the tire 52 include radial plies consisting of several layers of different fabrics coated with rubber, each of which could potentially have a different dielectric constant (ε). These layers are almost perpendicular to the surfaces of electrodes 62, 64 and, thus, will affect the ability to obtain even heating throughout the thickness of the tire 52. Thus, while this embodiment is better-suited for molding a car tire compared to the prior art system shown in FIG. 1, it will be seen that the second exemplary embodiment described below is preferred in that it decreases the molding/curing time of the tire and provides substantially even heating throughout the different thickness sections of the tire.

II. Second Exemplary Embodiment

Figure 4:
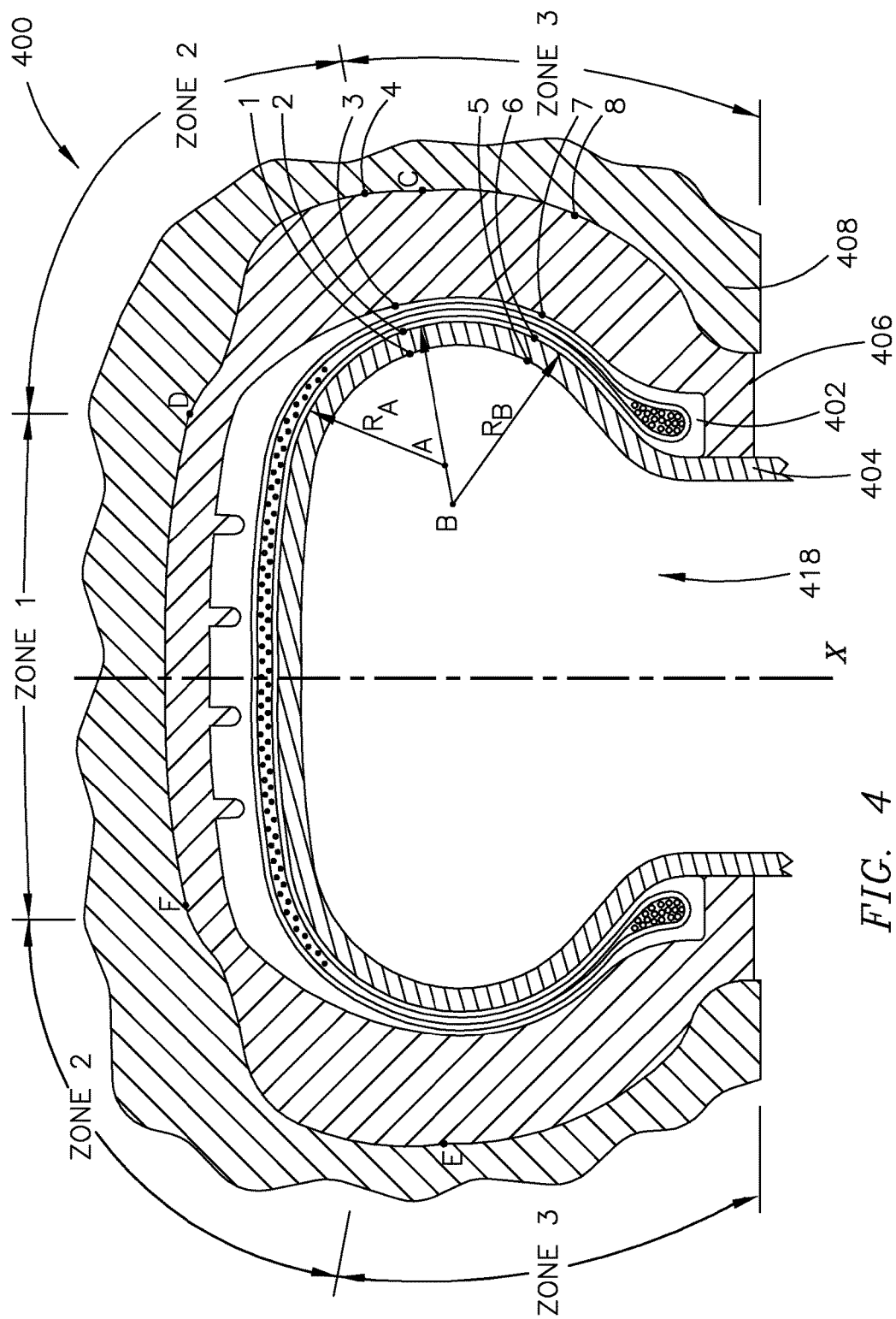
FIG. 4 is a cross-sectional view of a system for molding a car tire in accordance with a second exemplary embodiment of the present invention.

With reference to FIG. 4, a second exemplary embodiment of a system 400 for molding a car tire 402 (which has the same construction as car tire 300 shown in FIG. 2) is shown. As described in more detail below, system 400 generally consists of a bladder 404 that functions as both an inner mold and an inner electrode, an outer mold 406, and an outer electrode 408, which are generally symmetrical about center line X.

In a preferred embodiment, the rubber components of tire 402 are comprised of vulcanized tire rubber and optionally fresh unvulcanized rubber. During the same heating cycle, the vulcanized tire rubber is devulcanized as described in U.S. Pat. No. 8,357,726, which is incorporated herein by reference, and then revulcanized (along with vulcanization of the fresh unvulcanized rubber, if any) to form the molded car tire. The vulcanized tire rubber may be present in the composition at any suitable level—for example, about 10, 20 30, 40, 50, 60, 70, 80, 90, or 100 wt %. In an exemplary embodiment, the tire rubber is comprised of 70 wt % vulcanized tire rubber and 30 wt % fresh unvulcanized rubber. Other levels of vulcanized rubber and fresh unvulcanized rubber are also possible and within the scope of the invention. Of course, it should be understood that greater levels of vulcanized tire rubber will reduce the cost of raw material insofar as vulcanized tire rubber (which is recycled in this embodiment) is substantially less expensive that fresh unvulcanized rubber.

In an alternative embodiment, the rubber components of tire 402 are comprised of a composition of devulcanized/recycled tire rubber (which has been formed in a separate devulcanization process as described in U.S. Pat. No. 8,357,726) and optionally fresh unvulcanized rubber. Again, the devulcanized/recycled tire rubber may be present in the composition at any suitable level—for example, about 10, 20 30, 40, 50, 60, 70, 80, 90, or 100 wt %. In yet another alternative embodiment, the rubber components of tire 402 are comprised of only fresh unvulcanized rubber. Of course, the cost of raw material in this embodiment would be greater than that of the preferred embodiment insofar as it does not use recycled tire rubber.

In the second exemplary embodiment and as used in the various calculations below, it will be assumed that the rubber components of tire 402 have a dielectric constant of 5, a dissipation factor of 0.05, a specific heat of 1.42 J/g° C., and a density of 1.55 g/cm$^3$. It will also be assumed that the molding/curing temperature of the tire rubber is 150° C. Of course, one skilled in the art will understand that the molding/curing temperature will vary between different types of rubbers, albeit typically in the range of 150° C.-170° C.

Referring still to FIG. 4, system 400 can be divided into three different zones: (1) a first zone comprising the flat region along the tread area of tire 402 (identified as Zone 1); (2) a second zone comprising the small radius region at the transition between the right side of the tread area and the right sidewall of tire 402 and a corresponding small radius region at the transition between the left side of the tread area and the left sidewall of tire 402 (identified as Zone 2); and (3) a third zone comprising the large radius region around the right sidewall of tire 402 and a corresponding large radius region around the left sidewall of tire 402 (identified as Zone 3). In Zone 2, the radius point A and radial lines $R_A$ of the small radius region on the right-side of tire 402, which are shown in FIG. 4, mirror those on the left-side of tire 402 (not shown). Similarly, in Zone 3, the radius point B and radial lines $R_B$ of the large radius region on the right-side of tire 402, which are shown in FIG. 4, mirror those on the left-side of tire 402 (not shown).

As can be seen, the entire outer surface of tire 402 is in contact with outer mold 406, i.e., there are no air gaps between tire 404 and outer mold 406. Outer mold 406 is generally comprised of a thinner mold section adjacent the tread area of tire 402 in Zone 1 and thicker mold sections adjacent the small and large radius regions of tire 402 in Zones 2 and 3, respectively. Outer mold 406 is preferably made from a thermally conductive material having a low dissipation factor on the order of 0.01 or lower (typically about 0.002 to about 0.003). Suitable materials for outer mold 406 are CoolPoly® D5108 Thermally Conductive Polyphenylene Sulfide (PPS) or CoolPoly® D5506 Thermally Conductive Liquid Crystalline Polymer (LCP), both of which are available from Cool Polymers, Inc. of North Kingstown, R.I., which can be used at temperatures up to 630° F. Another suitable material for outer mold 406 is Ceramacast™ 675-N (ceramic doped with aluminum nitride) available from Aremco Products Inc. of Valley Cottage, N.Y., which can be used at higher temperatures up to 2200° F. Of course, other materials may also be used in accordance with the present invention.

In order to provide substantially even heating of tire 402, a constant capacitance is preferably maintained throughout all of the different thickness sections of tire 402. This may be accomplished by substantially matching the dielectric constant of outer mold 406 to the dielectric constant of the tire rubber (which is typically between 3 and 14), preferably by altering the dielectric constant of outer mold 406 via the use of one or more additives as described in U.S. Pat. No. 4,441,876, which is incorporated herein by reference. For example, if the dielectric constant of the tire rubber is 5 ($\varepsilon_{rubber}$=5), the dielectric constant of outer mold 406 is preferably modified to also be about 5 ($\varepsilon_{mold}$=5).

In this embodiment, bladder 404 functions as both an inner mold and an inner electrode. Bladder 404 may be made of a rubber compound such as, for example, silicone rubber mixed with thermal carbon black. A suitable bladder may comprise, for example, any of the butyl tire curing bladders available from Cancarb Limited of Alberta, Canada. Bladder 404 preferably conforms to the profile of the inner surface of tire 402 via the injection of either pressurized air or a liquid conductor, as generally shown by reference numeral 418, such that there are no air gaps between tire 402 and bladder 404. As such, bladder 404 functions as the inner mold. In order to also function as the inner electrode, bladder 404 is configured to contain a conductive metal mesh (e.g., a copper mesh) in which case pressurized air may be injected behind bladder 404. As an alternative to use of a conductive mesh, a liquid conductor (and not pressurized air) may be injected behind bladder 404. The liquid conductor may be comprised, for example, of Galinstan available from Geratherm Medical AG of Germany, which is a mixture of gallium, indium and tin. Preferably, the liquid conductor is in liquid form at −19° C. and reaches its boiling point at a temperature greater than 1,300° C.

Outer electrode 408 is positioned adjacent outer mold 406 and may be made of any metal or other conductive material. In this example, outer electrode 408 functions as the ground electrode and bladder/inner electrode 404 functions as the high voltage electrode (or vice versa). Bladder/inner electrode 404 and outer electrode 408 are connected to a generator (not shown) operable to generate an alternating electric field between the electrodes. The generator may contain a power tube and LC circuit, or may alternatively contain solid-state technology. The alternating electric field may be generated at frequencies ranging from about 1 MHz to 100 MHz, and is preferably generated from about 25 MHz to 50 MHz Most preferably, the alternating electric field is generated at either 27.12 MHz or 40.68 MHz, both of which are allowed center frequencies for industrial, scientific, and medical (ISM) applications. In this example, the alternating electric field is generated at 27.12 MHz One skilled in the art will understand that the alternating electric field causes movement of polar molecules in tire 402 whereby friction resulting from this molecular movement translates into heat throughout tire 402 (i.e., dielectric heating).

Figure 7:
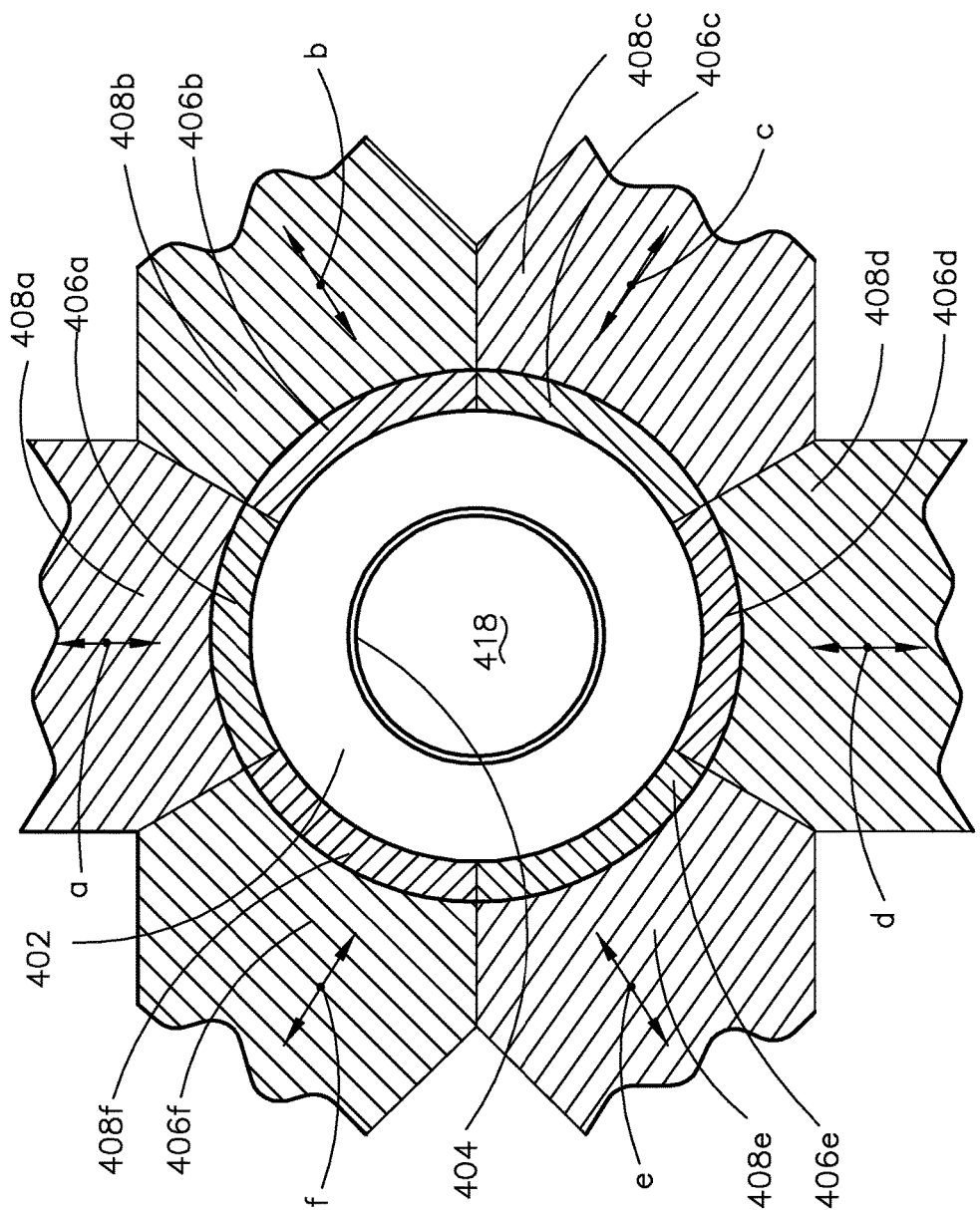
FIG. 7 is a top view of the system of FIG. 4 showing the separable sections of the outer mold and outer electrode that enable loading and unloading of the car tire.

In a preferred embodiment, outer mold 406 and outer electrode 408 are each comprised of a plurality of sections that can be moved away from tire 402 to an open position (to enable loading and unloading of the tire) and toward tire 402 to a closed position (as shown in FIG. 4 without the section lines). Preferably, each mold section is secured to a corresponding electrode section so as to enable each mold/electrode section to move together as a unit. For example, there may be six to eight mold/electrode sections positioned adjacent the tread area of tire 402 in Zone 1 (as shown in FIG. 7 and described further below); a mold/electrode section positioned adjacent the right side small radius region of tire 402 in Zone 2 and a corresponding mold/electrode section positioned adjacent the left side small radius region of tire 402 in Zone 2; and a mold/electrode section positioned adjacent the right side large radius region of tire 402 in Zone 3 and a corresponding mold/electrode section positioned adjacent the left side large radius region of tire 402 in Zone 3. Each of these mold/electrode sections are configured to separate from the other mold/electrode sections when moved away from tire 402 to the open position.

As shown in FIG. 7, the exemplary embodiment includes six mold/electrode sections positioned adjacent the tread area of tire 402 in Zone 1, as follows: a mold section 406a and a corresponding electrode section 408a that move in the direction of arrow a; a mold section 406b and a corresponding electrode section 408b that move in the direction of arrow b; a mold section 406c and a corresponding electrode section 408c that move in the direction of arrow c; a mold section 406d and a corresponding electrode section 408d that move in the direction of arrow d; a mold section 406e and a corresponding electrode section 408e that move in the direction of arrow e; and a mold section 406f and a corresponding electrode section 408f that move in the direction of arrow f.

In operation, the mold/electrode sections are moved to the open position in order to load the components of tire 402 into system 400. When loaded, the mold/electrode sections are moved toward tire 402 to the closed position and the bladder/inner mold 404 is pressurized via the injection of either pressurized air or a liquid conductor, as generally shown by reference numeral 418, such that there are no air gaps between tire 402 and bladder 404 (as discussed above). As such, bladder/inner mold 404 conforms to the profile of the inner surface of tire 402. An alternating electric field is then applied between bladder/inner electrode 404 and outer electrode 408 so as to vulcanize the rubber components of tire 402 during the heating cycle. At the end of the heating cycle, pressure is maintained on tire 402 for an additional one to two minutes to enable a complete chemical reaction to occur and thereby achieve vulcanization of the tire rubber. Then, the pressure is released and the mold/electrode sections are moved to the open position in order to unload tire 402 from system 400.

As can be seen in FIG. 4, bladder/inner electrode 404 and outer electrode 408 are substantially congruent/parallel to the corresponding surfaces of tire 402. Thus, the plies and steel belts of tire 402 are not perpendicular to the electrodes (unlike the prior art system of FIG. 1). Also, bladder/inner electrode 404 and outer electrode 408 are closely spaced so as to decrease the molding/curing time required for tire 402. At any given point, the spacing between bladder/inner electrode 404 and outer electrode 408 is equal to the thickness of tire 402 and outer mold 406 and is preferably 2 inches or less, i.e., 2 inches, 1.9 inches, 1.8 inches, 1.7 inches, 1.6 inches, 1.5 inches, 1.4 inches, 1.3 inches, 1.2 inches, 1.1 inches, or 1.0 inches or less. In most cases, the rubber in tire 402 can be heated to its molding/curing temperature in less than one minute. Of course, pressure is preferably maintained on the tire for an additional one to two minutes after heating to enable a complete chemical reaction to occur and thereby achieve vulcanization of the tire rubber.

The current flow caused by the generation of the alternating electric field between bladder/inner electrode 404 and outer electrode 408 is perpendicular to the surfaces of the electrodes. As such, the current lines are substantially parallel to each other in the flat region of Zone 1 so as to provide substantially the same current throughout the thickness of tire 402. This results in substantially even heating of tire 402 in the flat region. However, in the radial regions of Zones 2 and 3, it can be appreciated that the current lines have a higher density near bladder/inner electrode 404 than near outer electrode 408. Specifically, within each radial region, the current (I) is inversely proportional to the radius (R), as shown by the following equation:

$$\frac{R_1}{R_2} = \frac{I_2}{I_1} \tag{1}$$

where
$R_1$=the distance from the radius point to point 1 in the radial region;
$R_2$=the distance from the radius point to point 2 in the radial region;
$I_1$=the current through point 1 in the radial region; and
$I_2$=the current through point 2 in the radial region.

Thus, tire 402 will be unevenly heated in the radial regions of Zones 2 and 3, and, tire 402 will not heat at the same rate in the radial regions of Zones 2 and 3 compared to the flat region of Zone 1. In addition, the thickness of tire 402 varies in the radial regions of Zones 2 and 3, which further impacts the ability to evenly heat tire 42 in those regions.

As discussed in greater detail below, it is possible to obtain substantially the same current in Zone 1, Zone 2 and Zone 3—which results in substantially even heating of tire 402—by optimizing the configurations of outer mold 406 and outer electrode 408 in each of those zones. This is accomplished in two steps. In the first step, the configurations of outer mold 406 and outer electrode 408 are modified by: (1) calculating the current through the flat region of tire 402 in Zone 1; (2) calculating the radius of outer electrode 408 in Zone 2 (which in turn determines the thickness of outer mold 406 in Zone 2) that will enable substantially the same current to be provided through the inner surface of the small radius region of tire 402 in Zone 2 as that provided through the flat region of tire 402 in Zone 1; and (3) calculating the radius of outer electrode 408 in Zone 3 (which in turn determines the thickness of outer mold 406 in Zone 3) that will enable substantially the same current to be provided through the inner surface of the large radius region of tire 402 in Zone 3 as that provided through the flat region of tire 402 in Zone 1. As used herein, the term "substantially the same current" means that the difference between the current passing through a portion of an article compared to the current passing through each other portion of the article is ±10% or less, i.e., ±10%, ±9%, ±8%, ±7%, ±6%, ±5%, ±4%, ±3%, ±2%, ±1% or less. Various types of temperature compensation are also provided to: (a) compensate for the temperature differences between the inner and outer surfaces of tire 402 in the radial regions; (b) compensate for the temperature difference between the inside radius and outside radius around the circumference of tire 402; and (c) compensate for thermal conductivity losses due to the transfer of heat from tire 402 to the molds. In the second step, the spacing between the electrodes is further adjusted in Zone 2 and the upper portion of Zone 3 (which in turn determines the final shape of outer mold 406 in those zones) to compensate for the varying thicknesses of tire 402 in the radial regions.

Figure 5:
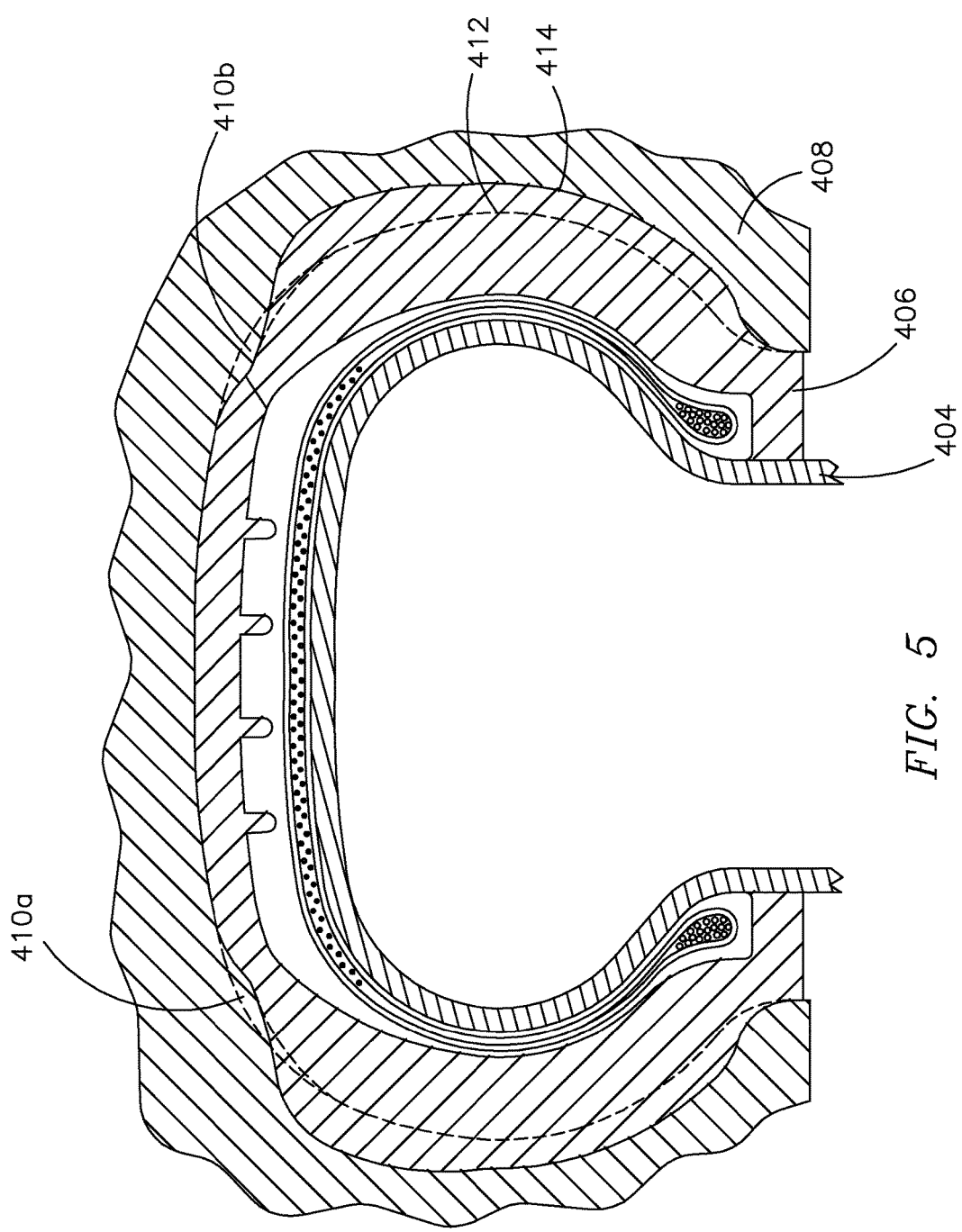
FIG. 5 is a cross-sectional view of the system of FIG. 4 showing the modifications made to the configurations of the outer mold and outer electrode in the small and large radius regions.

The modifications to the configurations of outer mold 406 and outer electrode 408 can be seen with reference to FIG. 5 in which the interface between the outside surface of the outer mold and the inside surface of the outer electrode without any modifications is shown as dashed line 412 and, in comparison, the interface between the outside surface of the outer mold and the inside surface of the outer electrode with the modifications generally described above (which is the same as outer mold 406 and outer electrode 408 shown in FIG. 4) is shown as solid line 414. An example will now be provided to illustrate the methodologies and calculations that are used to modify the configuration and shape of outer mold 406 and outer electrode 408 in accordance with the second exemplary embodiment of the present invention.

A. Step 1

1. Zone 1 (Flat Region)

Referring to FIG. 4, the capacitance of the flat region may be expressed by the following equation:

$$C = \frac{\varepsilon_o \times \varepsilon_r \times A}{d} \quad (2)$$

where

C=capacitance of flat region in picofarads;
$\varepsilon_0$=dielectric constant of a vacuum (8.85×10$^{-12}$ Farads/meter);
$\varepsilon_r$=dielectric constant of flat region;
A=area of flat region in meters$^2$; and
d=distance between the electrodes in meters.

Thus, the capacitance of the flat region may be calculated from equation (2) using the value for the dielectric constant of the flat region ($\varepsilon_{rubber}=\varepsilon_{mold}=5$), assuming that the distance (d) between bladder/inner electrode 404 and outer electrode 408 along the tread area is 1.36 inches (or 0.0345 meters), and assuming an area of 1 inches$^2$ in the flat region (wherein 1 inch=2.54×10$^{-2}$ meters), as follows:

$$C = \frac{8.85 \times 10^{-12} \times 5 \times (2.54 \times 10^{-2})^2}{0.0345} = 0.827 \text{ pF}$$

Preferably, the distance (d) between bladder/inner electrode 404 and outer electrode 408 along the tread area is the smallest distance that allows substantially even heating throughout the tire, i.e., the smallest distance that will provide substantially the same current in Zones 2 and 3 as that provided in Zone 1 (as discussed in greater detail below).

The reactance associated with the capacitance of the flat region may be given by the following equation:

$$X_c = \frac{1}{2\pi f C} \quad (3)$$

where $X_c$=reactance of region in ohms;
f=frequency of electric field in hertz; and
C=capacitance of region in farads.

Thus, the reactance associated with the capacitance of the flat region may be calculated from equation (3) using the values for the frequency of the electric field (27.12×10$^6$ Hz) and the capacitance of the flat region calculated above, as follows:

$$X_c = \frac{1}{2\pi \times 27.12 \times 10^6 \times 0.827 \times 10^{-12}} = 7,096 \ \Omega$$

The resistance of the flat region is equal to the product of the dissipation factor of that region and the reactance, as follows:

$$R = df \times X_c \quad (4)$$

where

R=resistance of region in ohms;
df=dissipation factor of region; and
$X_c$=reactance of region in ohms.

Thus, the resistance of the flat region may be calculated from equation (4) using the values for the dissipation factor of the flat region (df=0.05) and the reactance calculated above, as follows:

$$R = 0.05 \times 7,096 = 354.8 \Omega$$

Note that the dissipation factor of the flat region (df=0.05) is based on the dissipation factor of the tire rubber. The dissipation factor of outer mold 406 is negligible (e.g., about 0.002 to about 0.003) and, thus, we can simplify the calculation in equation (4) by ignoring the dissipation factor of outer mold 406.

Next, the current passing between bladder/inner electrode 404 and outer electrode 408 through the flat region may be represented by the following equation:

$$I = \frac{V}{\sqrt{X_c^2 + R^2}} \quad (5)$$

where

I=current in amperes;
V=voltage between the electrodes in volts;
$X_c$=reactance of region in ohms; and
R=resistance of region in ohms.

Thus, the current passing between bladder/inner electrode 404 and outer electrode 408 through the flat region may be calculated from equation (5) using the values for the reactance and resistance of the flat region calculated above and assuming a voltage of 3,000 volts, as follows:

$$I = \frac{3,000}{\sqrt{(7,096)^2 + (354.8)^2}} = 0.422 \ A$$

It can be appreciated that the low dissipation factor of the flat region causes the resistance in the flat region to be substantially smaller than the reactance in the flat region. As such, if we ignore the resistance in the flat region, equation (5) may be simplified as follows:

$$I = \frac{V}{X_c} \quad (6)$$

Using equation (6), the current passing between bladder/inner electrode 404 and outer electrode 408 through the flat region may be calculated using the value for the reactance of the flat region calculated above and assuming a voltage of 3,000 volts, as follows:

$$I = \frac{3{,}000}{7{,}096} = 0.42277 \text{ A}$$

The ratio of the current values calculated above using equations (5) and (6) (i.e., 0.42277/0.422) is only 1.0018. With reference to the power equation $P=I^2R$, it can be appreciated that the square of the current results in a difference of about 0.365 percent ($1.0018^2=1.00365$). Assuming that a temperature increase of 125° C. is required to heat the tire rubber to its molding/curing temperature, an inaccuracy of 0.365 percent would result in less than a 1° C. difference. Because this difference is negligible, we can simplify certain calculations below by ignoring the resistance component of the current equation.

Now, the power that is dissipated within the area of 1 inches$^2$ in the flat region due to the application of the alternating electric field may be expressed by the following equation:

$$P = R \cdot I^2 \qquad (7)$$

where
P=power dissipated in flat region in watts;
R=resistance of flat region in ohms; and
I=current in amperes.

Using equation (7), the power that is dissipated within the area of 1 inches$^2$ in the flat region due to the application of the alternating electric field may be calculated using the values for the resistance of the flat region and the current through the flat region, as follows:

$$P=(354.8)\times(0.422)^2=63.18 \text{ W}$$

It can be appreciated that 63.18 W dissipated within the area of 1 inches$^2$ equates to the dissipation of approximately 40 kW in the entire flat region.

The mass of the area of 1 inches$^2$ in the flat region may be expressed by the following equation:

$$m = D \cdot V \qquad (8)$$

where
m=mass in grams;
D=density of tire rubber in g/cm$^3$; and
V=volume of tire rubber in cm$^3$.

Using equation (8), the mass of the area of 1 inches$^2$ in the flat region may be calculated using the value for the density of the tire rubber (1.55 g/cm$^3$) and assuming that the thickness of the tread area of tire 402 is 0.66 inches (wherein the volume of the tire rubber is 1 inch×1 inch×0.66 inches=0.66 inches$^3$=10.82 cm$^3$), as follows:

$$m=(1.55)(10.82)=16.77 \text{ g}$$

In this example, we will assume that ambient temperature is 25° C. and the molding/curing temperature of the tire rubber is 150° C. (noting, of course, that the molding/curing temperature of the tire rubber could be higher or lower than 150° C.). The energy (Q) required to heat the tire rubber from the ambient temperature of 25° C. to the curing temperature of 150° C. may be expressed by the following equation:

$$Q = cm\Delta T \qquad (9)$$

where
Q=energy in joules;
c=specific heat of tire rubber in J/g C;
m=mass in grams;
$\Delta T$=change in temperature in C.

Using equation (9), the energy (Q) required to heat the tire rubber may be calculated using the value for the specific heat of the tire rubber (1.42 J/g C), the mass calculated above, and the desired change in temperature (150° C.−25° C.=125° C.), as follows:

$$Q=(1.42)(16.77)(125)=2976.7 \text{ J}$$

The time required to heat the tire rubber from the ambient temperature of 25° C. to the molding/curing temperature of 150° C. may be expressed by the following equation:

$$t = \frac{Q}{P} \qquad (10)$$

where
t=time in seconds;
Q=energy in joules; and
P=power in watts.

Using equation (10), the time required to heat the tire rubber may be calculated using the values for the energy and power calculated above, as follows:

$$t = \frac{2976.7}{63.18} = 47.1 \text{ sec}$$

Thus, the time necessary to heat the tire rubber to its molding/curing temperature is 47.1 seconds. Preferably, after the heating period of 47.1 seconds, pressure is maintained on the tire for an additional one to two minutes to enable a complete chemical reaction to occur and thereby achieve vulcanization of the tire rubber.

2. Zone 2 (Small Radius Regions) and Temperature Difference Between Inner and Outer Surfaces of Tire Referring still to FIG. 4, the second zone (Zone 2) comprises the small radius region at the transition between the right side of the tread area and the right sidewall of tire 402 and, similarly, the small radius region at the transition between the left side of the tread area and the left sidewall of tire 402. The calculations below will focus on the small radius region on the right side of tire 402. One skilled in the art will appreciate that the small radius region on the left side of tire 402 is a mirror image of the right-side small radius region and involves the same calculations as those set forth below.

As can be seen, the right-side small radius region includes several points that will be referenced in the calculations below, including: point A located at the radius point, i.e., the origin of the radius in Zone 2; point 1 located on the inner surface of bladder 404; point 2 located at the interface between the outer surface of bladder 404 and the inner surface of tire 402; point 3 located at the interface between the outer surface of tire 402 and the inner surface of outer mold 406; and point 4 located at the interface between the outer surface of outer mold 406 and the inner surface of outer electrode 408.

We will determine the distance from point A to point 4 (i.e., the radius R of outer electrode 408 in Zone 2) that will provide the same current through point 2 located on the inner surface of tire 402 as that provided in the flat region, i.e., 0.422 amperes. For purposes of this example, we will assume that the distance from point A to point 1 is 1.28 inches (i.e., the radius r of bladder/inner electrode 404 in Zone 2) and that the distance from point A to point 2 is 1.55 inches. As such, the thickness of bladder 404 is 0.27 inches.

As the radius increases in the small radius region (i.e., as we move further from the origin of the radius), the current decreases proportionally. Thus, using equation (1), we can calculate the current through point 1 that will provide a current of 0.422 amperes through point 2, as follows:

$$I_1 = \frac{R_2}{R_1}I_2 = \frac{1.55}{1.28}0.422 = 0.511 \text{ A}$$

Now, the reactance associated with the capacitance of the small radius region may be calculated from equation (6) using the current through point 1 calculated above and assuming a voltage of 3,000 volts, as follows:

$$0.511 = \frac{3,000}{X_C}; X_C = 5,870 \, \Omega$$

The capacitance of the small radius region may be calculated from equation (3) using the value for the frequency of the electric field ($27.12 \times 10^6$ Hz) and the reactance calculated above, as follows:

$$5,870 = \frac{1}{2\pi \times 27.12 \times 10^6 \times C}; C = 0.9997 \text{ pF}$$

The capacitance of the small radius region may also be expressed by the following equation:

$$C = \frac{2\pi\varepsilon_0\varepsilon_r \ell}{\ell n \frac{R}{r}} \quad (11)$$

where

C=capacitance of radial region in picofarads;
$\varepsilon_0$=dielectric constant of a vacuum ($8.85 \times 10^{-12}$ Farads/meter);
$\varepsilon_r$=dielectric constant of radial region;
l=length/depth in meters for an area of 1 inches$^2$;
R=radius of outer electrode in meters; and
r=radius of inner electrode in meters.

It can be appreciated that $2\pi \times r \times l = 2\pi \times 1.28 \times l = 1$ inches$^2$. As such, l can be calculated as 0.12434 inches or 0.003158 meters. Thus, the desired distance from point A to point 4 (i.e., the radius R of outer electrode 408 in Zone 2) may be calculated from equation (11) using the values for the capacitance of the small radius region (0.9997 pF), the dielectric constant of the small radius region ($\varepsilon_{rubber}=\varepsilon_{mold}=5$), the length/depth in meters for an area of 1 inches$^2$ (0.003158 meters), and the radius of bladder/inner electrode 404 (r=1.28 inches=0.03251 meters), as follows:

$$0.9997 = \frac{2\pi \times 8.85 \times 10^{-12} \times 5 \times 0.003158}{\ell n \frac{R}{0.03251}}$$

Thus, the desired distance from point A to point 4 (i.e., the radius R of outer electrode 408 in Zone 2) is 0.07821 meters or 3.079 inches, which will provide the same current of 0.422 amperes through point 2 of the small radius region as the current provided in the flat region.

For purposes of this example, we will assume that the distance from point A to point 3 is 1.8 inches and, as discussed above, the distance from point A to point 1 is 1.28 inches. As calculated above, the current through point 1 is 0.511 amperes. Thus, using equation (1), we can calculate the current through point 3 as follows:

$$I_3 = \frac{R_1}{R_3}I_1 = \frac{1.28}{1.8}0.511 = 0.362 \text{ A}$$

It can be appreciated that the temperature at point 2 on the inner surface of tire 402 is the 150° C. molding/curing temperature of the tire rubber, which is based on the ambient temperature of 25° C. plus the desired temperature increase of 125° C. With reference to the power equation P=I$^2$R, it should be understood that the heat provided in the tire rubber is proportional to I$^2$. Thus, the temperature increase at point 3 on the outer surface of tire 402 can be calculated by comparing (i) the ratio of the temperature increase at point 2 to the temperature increase at point 3 with (ii) the ratio of the square of the current through point 2 to the square of the current through point 3, as follows:

$$\Delta T_3 = \Delta T_2 \left(\frac{I_3}{I_2}\right)^2 = 125\left(\frac{0.362}{0.422}\right)^2 = 92.9° \text{ C.}$$

Thus, the temperature at point 3 is 117.9° C. (92.9° C.+25° C.). We can compensate for the lower temperature at point 3 on the outer surface of tire 402 (117.9° C.) compared to the higher temperature at point 2 on the inner surface of tire 402 (150° C.) by increasing the temperature of mold 406 in the small radius region by 32.1° C. (150° C.-117.9° C.), as described in greater detail below. As such, the temperature at point 3 on the outer surface of tire 402 will also be 150° C.

3. Zone 3 (Large Radius Regions) and Temperature Difference Between Inner and Outer Surfaces of Tire Referring still to FIG. 4, the third zone (Zone 3) comprises the large radius region around the right sidewall of tire 402 and, similarly, the large radius region around the left sidewall of tire 402. The calculations below will focus on the large radius region around the right side of tire 402. One skilled in the art will appreciate that the large radius region around the left side of tire 402 is a mirror image of the right-side large radius region and involves the same calculations as those set forth below.

As can be seen, the right-side large radius region includes several points that will be referenced in the calculations below, including: point B located at the radius point, i.e., the origin of the radius in Zone 3; point 5 located on the inner surface of bladder 404; point 6 located at the interface between the outer surface of bladder 404 and the inner surface of tire 402; point 7 located at the interface between the outer surface of tire 402 and the inner surface of mold 406; and point 8 located at the interface between the outer surface of mold 406 and the inner surface of electrode 408.

We will determine the desired distance from point B to point 8 (i.e., the radius R of outer electrode 408 in Zone 3) that will provide the same current through point 6 located on the inner surface of tire 402 as that provided in the flat region, i.e., 0.422 amperes. For purposes of this example, we will assume that the distance from point B to point 5 is 1.91 inches (i.e., the radius r of bladder/inner electrode 404 in Zone 3) and that the distance from point B to point 6 is 2.16 inches. As such, the thickness of bladder 404 is 0.25 inches. It should be noted that there will be some variance in the thickness of bladder 404 depending on the stretch of the material at various points along the inner surface of tire 402.

As the radius increases in the large radius region (i.e., as we move further from the origin of the radius), the current decreases proportionally. Thus, using equation (1), we can calculate the current through point 5 that will provide a current of 0.422 amperes through point 6, as follows:

$$I_5 = \frac{R_6}{R_5} I_6 = \frac{2.16}{1.91} 0.422 = 0.477 \text{ A}$$

Now, the reactance associated with the capacitance of the large radius region may be calculated from equation (6) using the current through point 5 calculated above and assuming a voltage of 3,000 volts, as follows:

$$0.477 = \frac{3,000}{X_C}; X_C = 6,289 \, \Omega$$

The capacitance of the large radius region may be calculated from equation (3) using the value for the frequency of the electric field (27.12×10⁶ Hz) and the reactance calculated above, as follows:

$$6,289 = \frac{1}{2\pi \times 27.12 \times 10^6 \times C}; C = 0.9335 \text{ pF}$$

It can be appreciated that 2πr×l=2π×1.91×l=1 inches². As such, l can be calculated as 0.08336 inches or 0.00211 meters. Thus, the desired distance from point B to point 8 (i.e., the radius R of outer electrode 408 in Zone 3) may be calculated from equation (11) using the values for the capacitance of the large radius region (0.9335 pF), the dielectric constant of the large radius region ($\varepsilon_{rubber}=\varepsilon_{mold}=5$), the length/depth in meters for an area of 1 inches² (0.00211 meters), and the radius of bladder/inner electrode 404 (r=1.91 inches=0.04851 meters), as follows:

$$0.9335 = \frac{2\pi \times 8.85 \times 10^{-12} \times 5 \times 0.00211}{\ell n \frac{R}{0.04851}}$$

Thus, the desired distance from point B to point 8 (i.e., the radius R of outer electrode 408 in Zone 3) is 0.09093 meters or 3.58 inches, which will provide the same current of 0.422 amperes through point 6 of the large radius region as the current provided in the flat region.

For purposes of this example, we will assume that the distance from point B to point 7 is 2.415 inches and, as discussed above, the distance from point B to point 5 is 1.91 inches. As calculated above, the current through point 5 is 0.477 amperes. Thus, using equation (1), we can calculate the current through point 7 as follows:

$$I_7 = \frac{R_5}{R_7} I_5 = \frac{1.91}{2.415} 0.477 = 0.377 \text{ A}$$

It can be appreciated that the temperature at point 5 on the inner surface of tire 402 is the 150° C. molding/curing temperature of the tire rubber, which is based on the ambient temperature of 25° C. plus the desired temperature increase of 125 C. With reference to the power equation P=I²R, it should be understood that the heat provided in the tire rubber is proportional to I². Thus, the temperature increase at point 7 on the outer surface of tire 402 can be calculated by comparing (i) the ratio of the temperature increase at point 6 to the temperature increase at point 7 with (ii) the ratio of the square of the current through point 6 to the square of the current through point 7, as follows:

$$\Delta T_7 = \Delta T_6 \left(\frac{I_7}{I_6}\right)^2 = 125 \left(\frac{0.377}{0.422}\right)^2 = 100.2° \text{ C.}$$

Thus, the temperature at point 7 is 125.2° C. (100.2° C.+25° C.). We can compensate for the lower temperature at point 7 on the outer surface of tire 402 (125.2° C.) compared to the higher temperature at point 6 on the inner surface of tire 402 (150° C.) by increasing the temperature of mold 406 in the large radius region by 24.8° C. (150° C.-125.2° C.), as described in greater detail below. As such, the temperature at point 7 on the outer surface of tire 402 will also be 150° C.

4. Temperature Difference Between Inside Radius and Outside Radius Around Tire Circumference It should be understood that there is another curvature around the circumference of tire 402 in a direction that is perpendicular to the cross-sectional view shown in FIG. 4, e.g., Zones 1, 2 and 3 shown in FIG. 4 actually extend around the circumference of tire 402. In this example, the outside radius of tire 402 is 12.5 inches and the inside radius of tire 402 is 11.85 inches. Using equation (1), we can compare (i) the ratio of the current through the outside radius of tire 402 to the current through the inside radius of tire 402 with (ii) the ratio of the inside radius of tire 402 to the outside radius of tire 402, as follows:

$$I_{outside} = \frac{R_{inside}}{R_{outside}} I_{inside} = \frac{11.85}{12.5} I_{inside} = 0.948 \, I_{inside}$$

With reference to the power equation P=I²R, it should be understood that the heat provided in the tire rubber is proportional to I². Thus, if the temperature of the inside radius of tire 402 is increased by 125° C. to 150° C., the temperature of the outside radius of tire 402 will increase by 112° C. (0.948²×125° C.) to 137° C. We can compensate for the lower temperature of the outside radius of tire 402 (137° C.) compared to the higher temperature of the inside radius of tire 402 (150° C.) by increasing the temperature of outer mold 406 by 13° C. (150° C.-137° C.), as described in greater detail below. As such, the temperature of the outside radius of tire 402 will also be 150° C.

5. Thermal Conductivity Losses

The present invention dramatically decreases the time required to heat a complex three-dimensional article, such as car tire 402 shown in FIG. 4. As such, the heat transferred from tire 402 to either bladder/inner mold 404 or outer mold 406 due to thermal conductivity is not large. With that said, the surfaces of tire 402 in contact with the molds may not reach the desired molding/curing temperature due to at least some heat transfer to the molds. Specifically, the inner surface of car tire 402 may not reach the desired molding/curing temperature of 150° C. due to some heat transfer to bladder/inner mold 404 and the outer surface of car tire 402 may not reach the desired molding/curing temperature of 150° C. due to some heat transfer to outer mold 406. In that case, the surfaces of car tire 402 will not be fully vulcanized. These thermal conductivity losses can be compensated for as described below.

6. Overall Temperature Compensation

As described above, various types of temperature compensation are needed to: (a) compensate for the temperature differences between the inner and outer surfaces of tire 402 in the radial regions; (b) compensate for the temperature difference between the inside radius and outside radius around the circumference of tire 402; and (c) compensate for thermal conductivity losses due to the transfer of heat from tire 402 to the molds.

One solution is to preheat and maintain the temperatures of bladder/inner mold 404 and outer mold 406 at a substantially constant temperature throughout the heating cycle so as to neutralize the thermal conductivity losses, wherein that temperature is chosen so as to provide the other required temperature compensation described above. As used herein, the term "substantially constant temperature" means that the temperature of a mold during a heating cycle deviates by ±15° C. or less, i.e., ±15° C., ±14° C., ±13° C., ±12° C., ±11° C., ±10° C., ±9° C., ±8° C., ±7° C., ±6° C., ±5° C., ±4° C., ±3° C., ±2° C., ±1° C. or less. In one example, throughout the heating cycle, bladder/inner mold 404 and outer mold 406 are each maintained at a temperature equal to the ambient temperature plus one-half of the desired temperature increase of tire 402 plus any required temperature compensation, as follows:

$$T_{mold} = T_{ambient} + \tfrac{1}{2}\Delta T + T_{compensation} \quad (12)$$

where $T_{mold}$=mold temperature maintained throughout heating cycle in C;

$T_{ambient}$=ambient temperature in C;

$\Delta T$=desired temperature increase in C; and $T_{compensation}$=required temperature compensation in C.

By maintaining each mold at a substantially constant temperature, each mold will heat the respective surface of tire 402 during the first half of the heating cycle (i.e., the temperature of each mold will be greater than the temperature of the respective surface of tire 402 during this time) and each mold will cool the respective surface of tire 402 during the second half of the heating cycle (i.e., the temperature of each mold will be less than the temperature of the respective surface of tire 402 during this time). As such, the heat transfer between tire 402 and the molds due to thermal conductivity will be neutralized at the end of the heating cycle. Of course, one skilled in the art will understand that if the heating rate is not uniform for a particular moldable material, the ½ ΔT factor in equation (12) above may be replaced with a multiplier other than ½ depending on the heating curve for the material.

This solution will be further described with reference to the second exemplary embodiment described above in which the ambient temperature is 25° C. and the molding/curing temperature of the tire rubber is 150° C. and, thus, the desired temperature increase is 125° C. In this example, the temperature at which to maintain bladder/inner mold 404 throughout the heating cycle can be calculated from equation (12) as follows:

$$T_{inner} = 25 + \tfrac{1}{2}125 + 0 = 87.5° \text{ C.}$$

As discussed above, the temperature of outer mold 406 in the flat region must be increased by 13° C. in order to compensate for the radius of curvature around the circumference of tire 402. As such, the temperature at which to maintain outer mold 406 in the flat region throughout the heating cycle can be calculated from equation (12) as follows:

$$T_{outer/flat} = 25 + \tfrac{1}{2}125 + 13 = 100.5° \text{ C.}$$

As discussed above, the temperature of outer mold 406 in the small radius region must be increased by 32.1° C. in order to compensate for the difference in temperature between the outer and inner surfaces of tire 402 in this region, and, must be increased by 13° C. in order to compensate for the radius of curvature around the circumference of tire 402. As such, the temperature at which to maintain outer mold 406 in the small radius region throughout the heating cycle can be calculated from equation (12) as follows:

$$T_{outer/small\ radius} = 25 + \tfrac{1}{2}125 + 32.1 + 13 = 132.6° \text{ C.}$$

As discussed above, the temperature of outer mold 406 in the large radius region must be increased by 24.8° C. in order to compensate for the difference in temperature between the outer and inner surfaces of tire 402 in this region, and, must be increased by 13° C. in order to compensate for the radius of curvature around the circumference of tire 402. As such, the temperature at which to maintain outer mold 406 in the large radius region throughout the heating cycle can be calculated from equation (12) as follows:

$$T_{outer/large\ radius} = 25 + \tfrac{1}{2}125 + 24.8 + 13 = 125.3° \text{ C.}$$

Thus, throughout the heating cycle, bladder/inner mold 404 is maintained at a temperature of about 87.5° C., outer mold 406 in the flat region is maintained at a temperature of about 100.5° C., outer mold 406 in each small radius region is maintained at a temperature of about 132.6° C., and outer mold 406 in each large radius region is maintained at a temperature of about 125.3° C. As such, the tire rubber in all of the different regions of tire 402 will reach about 150° C. at the end of the heating cycle so as to enable tire 402 to be fully vulcanized.

One skilled in the art will understand that the solution described above is not limited to the molding of a complex three-dimensional article such as car tire 402. Rather, this method could be used to compensate for the thermal conductivity losses when molding any type and configuration of article.

Another solution is to modify the inner skin of outer mold 408 so as to reach a temperature at the end of the heating cycle that is substantially the same as the 150° C. molding/curing temperature of the tire rubber in order to compensate for the thermal conductivity losses, as well as provide the other required temperature compensation described above. As used herein, the temperature of an inner skin of the outer mold compared to the molding temperature of the moldable material at the end of the heating cycle is ±15° C. or less, i.e., ±15° C., ±14° C., ±13° C., ±12° C., ±11° C., ±10° C., ±9° C., ±8° C., ±7° C., ±6° C., ±5° C., ±4° C., ±3° C., ±2° C., ±1° C. or less. Preferably, the skin of outer mold 408 is modified by increasing its dissipation factor via the use of one or more suitable additives as described in U.S. Pat. Nos. 7,837,910 and 8,236,212, both of which are incorporated herein by reference, to thereby heat the mold skin at a faster rate than the mold skin without such modification. Preferably, the skin of outer mold 408 comprises the surface portion of mold 408 in contact with tire 402 and having a thickness of about ⅛ inches or less, i.e., 0.125 inches, 0.100 inches, 0.075 inches, 0.050 inches, 0.025 inches, 0.020 inches, 0.015 inches or 0.010 inches. By modifying the skin of outer mold 408, the outer surface of tire 402 will reach its 150° C. molding/curing temperature at the end of the heating cycle so as to enable tire 402 to be fully vulcanized. One skilled in the art will appreciate that the entire outer mold 408 could be modified as described above; however, this approach is not preferred insofar as it would use more energy than heating only the mold skin.

Of course, an external heater must also be used to provide the other required temperature compensation described above. Specifically, the temperature of outer mold 406 in the flat region must be increased by 13° C. in order to compensate for the radius of curvature around the circumference of tire 402. Also, the temperature of outer mold 406 in the small radius region must be increased by a total of 45.1° C., i.e., an increase of 32.1° C. in order to compensate for the difference in temperature between the outer and inner surfaces of tire 402 in this region, and, an increase of 13° C. in order to compensate for the radius of curvature around the circumference of tire 402. In addition, the temperature of outer mold 406 in the large radius region must be increased by a total of 37.8° C., i.e., an increase of 24.8° C. in order to compensate for the difference in temperature between the outer and inner surfaces of tire 402 in this region, and, an increase of 13° C. in order to compensate for the radius of curvature around the circumference of tire 402.

Finally, looking to FIG. 2, it can be seen that the lower edge of each of sidewalls 308, 310 terminates in a slightly bulbous bead portion 318a, 318b comprised of bead wires and bead filler forming a bead chaffer 320a, 320b to seal against a wheel when installed. Because the metal in the bead wires has a high thermal conductivity, it will draw some heat away from the tire rubber in the bead area. To compensate for this heat loss, it can be seen in FIG. 4 that the spacing between bladder/inner electrode 404 and outer electrode 408 has been reduced in the bead area in order to slightly overheat the tire rubber in this area. It should also be noted that the bead wires and steel belts of tire 402 are congruent/parallel to the surfaces of bladder/inner electrode 404 and outer electrode 408 (as opposed to steel belts that are perpendicular to the electrodes as in the prior art system shown in FIG. 1). As such, the bead wires and steel belts of tire 402 do not carry any current or bring a voltage to another place that would otherwise cause uneven heating of the tire rubber in tire 402.

B. Step 2

In the second step, the spacing between the electrodes is further adjusted in Zone 2 and the upper portion of Zone 3 to compensate for the varying thicknesses of tire 402. Specifically, the shape of outer electrode 408 is adjusted via the use of electrode sections 410a and 410b (best shown in FIG. 5) that have been added to or formed integrally with outer electrode 408 to narrow the spacing between bladder/inner electrode 404 and outer electrode 408. It can be appreciated that the adjustments to the shape of outer electrode 408 will determine the final shape of outer mold 406. The adjusted shapes of outer mold 406 and outer electrode 408 are shown in FIG. 4, wherein the adjusted mold/electrode interface is shown as segment CD on the right side of tire 402 and as segment EF on the left side of tire 402. One skilled in the art will appreciate that the curvatures of segments CD and EF are determined point by point so as to bend the current lines and compensate for the varying thicknesses of tire 402, as will be described in greater detail below in connection with the third exemplary embodiment. This adjustment results in substantially even heating throughout the different thicknesses of tire 402.

III. Third Exemplary Embodiment

Figure 6:
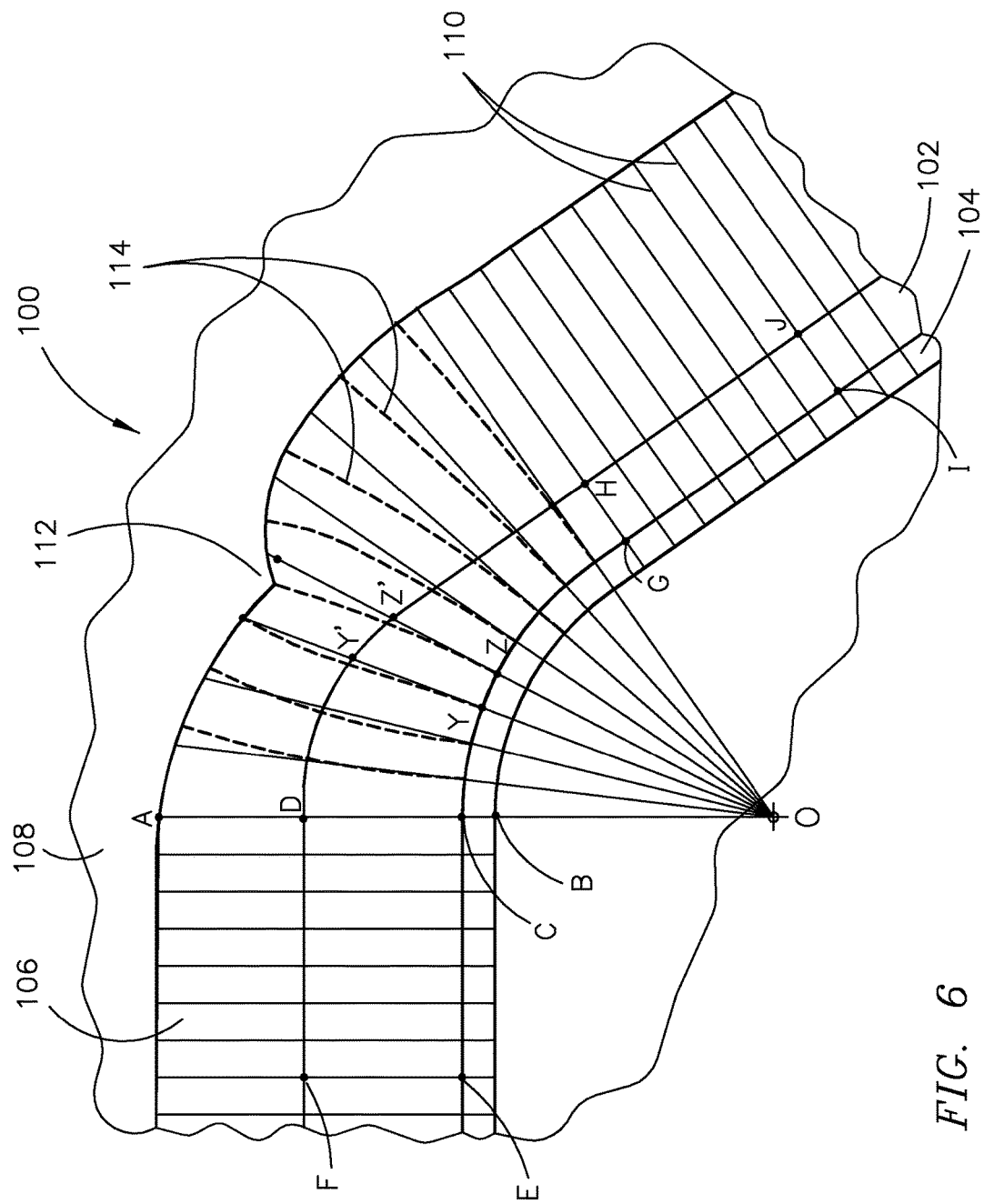
FIG. 6 is an enlarged cross-sectional view of a system for molding a tire in accordance with a third exemplary embodiment of the present invention, which shows the modifications made to the configurations of the outer mold and outer electrode in the radial region.

With reference to FIG. 6, a third exemplary embodiment of a system 100 for molding a tire 102 is shown. In this embodiment, the system generally consists of a bladder 104 that functions as both an inner mold and an inner electrode, an outer mold 106, and an outer electrode 108. System 100 has substantially the same configuration as system 400 shown in FIG. 4 and, thus, will not be described in greater detail. It should be understood that this embodiment is provided to further describe the methodologies used to provide substantially even heating in a radial region and compensate for the varying thicknesses of an article (in this case, tire 102) in the radial region. For clarity, the hatch lines used to show the cross-sectional view of system 100 are not shown in FIG. 6 so as to better illustrate the current lines 110 and 114 (discussed below).

Tire 102 includes two flat regions, i.e., the flat region defined between segments EC and FD and the flat region defined between segments GI and HJ. Tire 102 also includes a radial region defined between segments CG and DH with a radius point O. In the radial region, outer electrode 108 has a radius R measured from the radius point O to point A, and, bladder/inner electrode 104 has a radius r measured from the radius point O to point B. It can be seen that the radial region of tire 102 has varying thicknesses, e.g., the thickness of tire 102 near segment CD is over twice that of the thickness of tire 102 near segment GH.

The current flow caused by the generation of the alternating electric field between bladder/inner electrode 104 and outer electrode 108 (prior to adjustment, as described below) is depicted by the series of current lines designated as reference numeral 110, which extend perpendicularly between the electrodes. Stated another way, the current lines 110 extend perpendicularly to the equipotential lines (i.e., even voltage) of the electrodes. As can be seen, the current density is substantially the same in the flat regions of tire 102, i.e., the region defined between segments EC and FD and the region defined between segments GI and HJ. This results in substantially even heating of tire 102 in those regions. However, in the radial region defined between segments CG and DH, current lines 110 have a higher density near bladder/inner electrode 104 than near outer electrode 108. For example, it can be seen that the length along segment YZ on the inner surface of tire 102 is less than the length of the corresponding segment Y'Z' on the outer surface of tire 102. Thus, the current density along segment YZ is greater than the current density along segment Y'Z' by an amount equal to the ratio of the radius R of outer electrode 108 to the radius r of bladder/inner electrode 104, i.e., R/r. As discussed above, outer mold 106 must be heated in the radial region to compensate for the temperature differences between the inner and outer surface of tire 102.

It should also be understood that the distance between current lines on the outer surface of tire 102 (e.g., segment Y'Z') is not uniform due to the varying thicknesses of tire 102 in the radial region. In order to compensate for these varying thicknesses, the shape of outer electrode 108 is adjusted via the use of electrode section 112 that has been added to or formed integrally with outer electrode 108 to narrow the spacing between bladder/inner electrode 104 and outer electrode 108 in the radial region. It can be appreciated that the adjustment to the shape of outer electrode 108 will determine the final shape of outer mold 106. The change in spacing between the electrodes is determined point by point so as to bend the current lines and compensate for the varying thicknesses of tire 102 in the radial region, as depicted by the dashed current lines 114. It can be seen that the dashed current lines 114 are perpendicular to the surfaces of bladder/inner electrode 104 and outer electrode 108 (as adjusted). This adjustment results in substantially even heating throughout the different thicknesses of tire 102, i.e., the distance between current lines on the outer surface of tire 102 is now uniform (albeit this distance is greater than the distance between current lines on the inner surface of tire 102, which can be compensated for with the use of an external heater). Of course, one skilled in the art will understand that the required adjustments and final shapes of outer electrode 108 and outer mold 106 will depend on the shape of the article being molded.

While the third exemplary embodiment shown in FIG. 6 (as well as the second exemplary embodiment shown in FIGS. 4 and 5) relies on an adjustment to the shape of the outer electrode, it should be understood that other embodiments may instead rely on an adjustment to the shape of the inner electrode so as to effectively bend the current lines between the electrodes and thereby obtain substantially even heating throughout the thicknesses of an article.

IV. Fourth Exemplary Embodiment

In a fourth exemplary embodiment, the present invention is used in connection with a retreading process for used tires. In this example, a consistent amount of the remaining rubber on a used tire is removed so as to provide a uniform surface on which to add new rubber material. This step is typically referred to as buffing the used tire, which may also include providing a texture on the tire surface to facilitate adhesion of new rubber material. Then, a thin layer of liaison rubber is applied to the textured surface (which may be approximately 1/16" thick) and a thicker layer of new tread rubber is applied to the liaison rubber (which may be approximately 1" thick). It can be appreciated that the liaison rubber provides an interface between the new tread rubber and the existing surface of the tire. The tire is then placed in a mold and heated to its molding/curing temperature as described above, whereby the new rubber material flows into the textured surface of the tire so as to provide a mechanical and chemical bond to the existing tire surface. As such, the present invention can be used to retread a used tire and is not limited to the manufacture of a whole new tire as in the exemplary embodiments above.

While the present invention has been described and illustrated hereinabove with reference to several exemplary embodiments, it should be understood that various modifications could be made to these embodiments without departing from the scope of the invention. Therefore, the present invention is not to be limited to the specific configuration and materials of the exemplary embodiments described and illustrated hereinabove, except insofar as such limitations are included in the following claims.

What is claimed and desired to be secured by Letters Patent is as follows:

1. A system for molding a three-dimensional article during a heating cycle, comprising:

a mold for receiving an article made of at least one moldable material, wherein the article has an inner surface and an outer surface and comprises a flat region and a radial region, wherein the article has varying thicknesses in the radial region, wherein the mold comprises an inner bladder that conforms to the inner surface of the article when pressurized and an outer mold that contacts the outer surface of the article, wherein the outer mold has a dielectric constant that is modified to match a dielectric constant of the moldable material;

an inner electrode spaced from an outer electrode, wherein the outer electrode has a radius (R) in the radial region that is calculated to enable substantially the same current to be provided through the inner surface of the article in the radial region and through the flat region of the article, and wherein the outer mold in the radial region is configured to be externally heated during the heating cycle to compensate for a temperature difference between the inner and outer surfaces of the article in the radial region, and wherein the spacing between the electrodes is adjusted to compensate for the varying thicknesses of the article in the radial region; and a generator operable to generate an alternating electric field between the inner and outer electrodes and across the article in the mold to obtain substantially even heating of the moldable material in the flat region and the radial region of the article at the end of the heating cycle.

2. The system of claim 1, wherein the radius (R) of the outer electrode in the radial region determines a thickness of the outer mold in the radial region.

3. The system of claim 1, wherein the article comprises a tire or a retreaded tire.

4. The system of claim 1, wherein a temperature of a point on or within the moldable material compared to a temperature of each other point on or within the moldable material is ±15° C. or less at the end of the heating cycle.

5. The system of claim 1, wherein the bladder functions as both the inner mold and the inner electrode, and wherein the bladder either (1) contains a conductive mesh and conforms to the inner surface of the article via injection of pressurized air behind the bladder or (2) conforms to an inner surface of the moldable material via injection of a liquid conductor behind the bladder.

6. The system of claim 1, wherein a distance between the electrodes is equal to a combined thickness of the article and the outer mold at any given point.

7. A system for molding a three-dimensional article during a heating cycle, comprising:

a mold for receiving an article made of at least one moldable material, wherein the article has an inner surface and an outer surface and comprises a flat region and a radial region, wherein the mold comprises an inner bladder that conforms to the inner surface of the article when pressurized and an outer mold that contacts the outer surface of the article; and an inner electrode spaced from an outer electrode, wherein the outer electrode has a radius (R) in the radial region that is calculated to enable substantially the same current to be provided through the inner surface of the article in the radial region and through the flat region of the article, and wherein the outer mold in the radial region is configured to be externally heated during the heating cycle to compensate for a temperature difference between the inner and outer surfaces of the article in the radial region;

a generator operable to generate an alternating electric field between the inner and outer electrodes and across the article in the mold to obtain substantially even heating of the moldable material in the flat region and the radial region of the article at the end of the heating cycle.

8. The system of claim 7, wherein the radius (R) of the outer electrode in the radial region determines a thickness of the outer mold in the radial region.

9. The system of claim 7, wherein the outer mold is externally heated during the heating cycle to compensate for a temperature difference between an inside radius and an outside radius around a circumference of the article.

10. The system of claim 7, wherein the inner bladder and the outer mold in the flat region and the radial region are each preheated and maintained at a substantially constant temperature during the heating cycle so as to neutralize thermal conductivity losses between the moldable material and the mold during the heating cycle.

11. The system of claim 7, wherein the inner bladder and at least an inner skin of the outer mold are each modified to reach a temperature that is substantially the same as a molding temperature of the moldable material at the end of the heating cycle so as to neutralize thermal conductivity losses between the moldable material and the mold during the heating cycle.

12. The system of claim 11, wherein the inner bladder and the inner skin of the outer mold are each modified by increasing its dissipation factor via the use of one or more additives.

13. The system of claim 7, wherein the article has varying thicknesses in the radial region, and wherein the spacing between the electrodes is adjusted to compensate for the varying thicknesses.

14. The system of claim 7, wherein the moldable material comprises at least 70 wt % vulcanized rubber that is devulcanized and revulcanized during the heating cycle.

15. The system of claim 14, wherein the moldable material further comprises fresh unvulcanized rubber.

16. The system of claim 7, wherein the moldable material comprises at least 70 wt % devulcanized rubber that is revulcanized during the heating cycle.

17. The system of claim 16, wherein the moldable material further comprises fresh unvulcanized rubber.

18. The system of claim 7, wherein the moldable material comprises fresh unvulcanized rubber.

19. The system of claim 7, wherein the article comprises a tire.

20. The system of claim 19, wherein the tire comprises a plurality of rubber components that are molded during the heating cycle.

21. The system of claim 7, wherein the article comprises a retreaded tire.

22. The system of claim 21, wherein tread rubber is added to a surface of a previously molded tire and molded during the heating cycle.

23. The system of claim 7, wherein a temperature of a point on or within the moldable material compared to a temperature of each other point on or within the moldable material is ±25° C. or less at the end of the heating cycle.

24. The system of claim 7, wherein a temperature of a point on or within the moldable material compared to a temperature of each other point on or within the moldable material is ±15° C. or less at the end of the heating cycle.

25. The system of claim 7, wherein a temperature of a point on or within the moldable material compared to a temperature of each other point on or within the moldable material is ±5° C. or less at the end of the heating cycle.

26. The system of claim 7, wherein the bladder functions as both the inner mold and the inner electrode.

27. The system of claim 26, wherein the bladder contains a conductive mesh and conforms to the inner surface of the article via injection of pressurized air behind the bladder.

28. The system of claim 26, wherein the bladder conforms to an inner surface of the moldable material via injection of a liquid conductor behind the bladder.

29. The system of claim 7, wherein the alternating electric field is generated at frequencies ranging from about 1 MHz to 100 MHz.

30. The system of claim 7, wherein the outer mold has a dielectric constant that is modified to match a dielectric constant of the moldable material.

31. The system of claim 7, wherein the article further comprises a metal component, and wherein the electrodes are substantially congruent to the metal component of the article.

32. The system of claim 7, wherein a distance between the electrodes is equal to a combined thickness of the article and the outer mold at any given point.

33. A system for molding a three-dimensional article during a heating cycle, comprising:

a mold for receiving an article made of at least one moldable material, wherein the article has an inner surface and an outer surface and comprises a flat region and a radial region, wherein the mold comprises an inner mold that contacts the inner surface of the article and an outer mold that contacts the outer surface of the article;

an inner electrode spaced from an outer electrode, wherein the outer electrode has a radius (R) in the radial region that is calculated to enable substantially the same current to be provided through the inner surface of the article in the radial region and through the flat region of the article, and wherein the outer mold in the radial region is configured to be externally heated during the heating cycle to compensate for a temperature difference between the inner and outer surfaces of the article in the radial region; and a generator operable to generate an alternating electric field between the inner and outer electrodes and across the article in the mold to obtain substantially even heating of the moldable material at the end of the heating cycle, wherein the inner and outer molds are each preheated and maintained at a substantially constant temperature during the heating cycle so as to neutralize thermal conductivity losses between the moldable material and the mold.

34. The system of claim 33, wherein a temperature of a point on or within the moldable material compared to a temperature of each other point on or within the moldable material is ±15° C. or less at the end of the heating cycle.

35. The system of claim 33, wherein the article further comprises a metal component, and wherein the electrodes are substantially congruent to the metal component of the article.

* * * * *